Dec. 16, 1969  A. C. LANGER  3,484,832
FASTENER MEANS
Filed Oct. 23, 1967  2 Sheets-Sheet 1
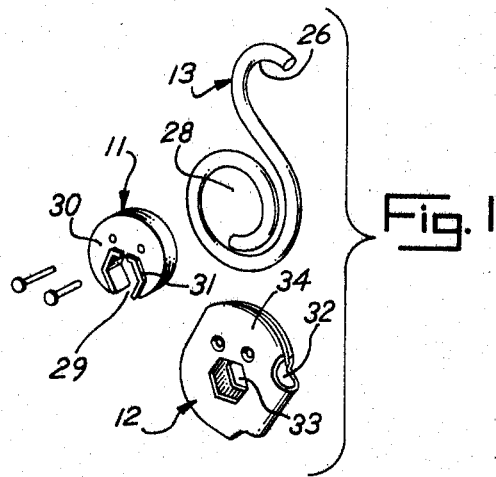
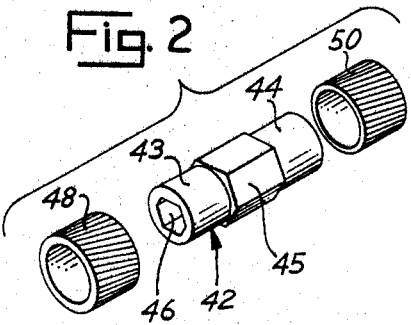
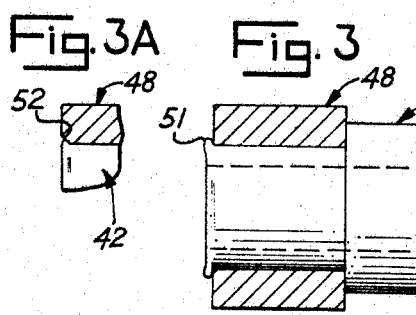
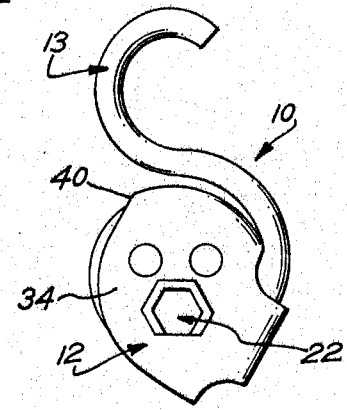
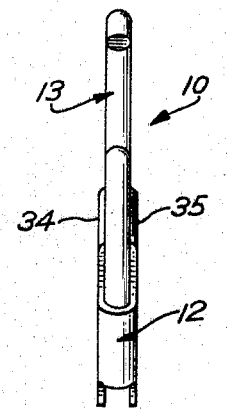
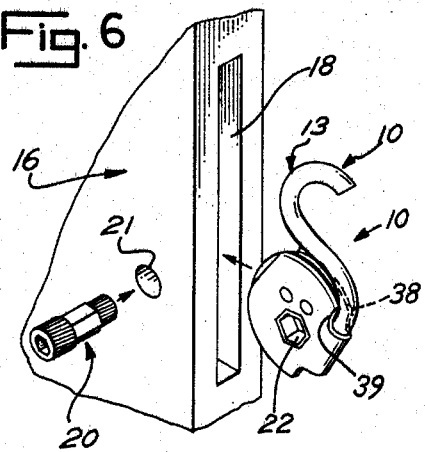
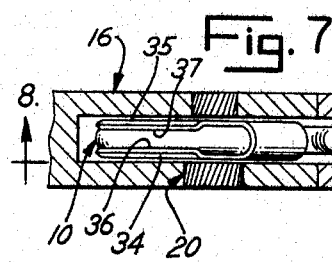
INVENTOR.
ALFRED C. LANGER
BY
Dominik, Stein & Knechtel
ATTORNEYS Dec. 16, 1969     A. C. LANGER     3,484,832
FASTENER MEANS
Filed Oct. 23, 1967     2 Sheets-Sheet 2
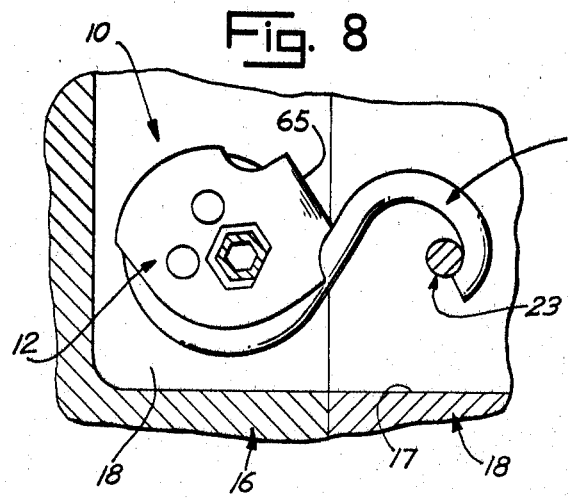
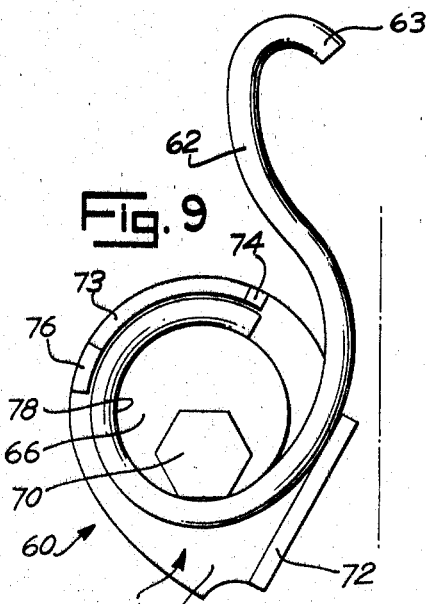
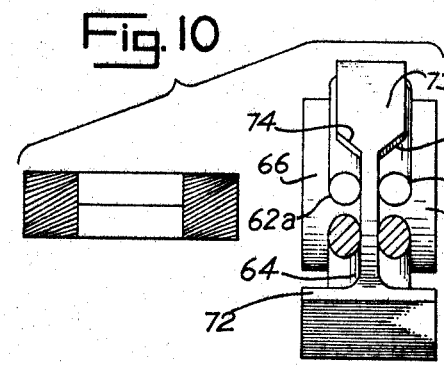
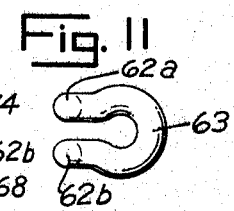
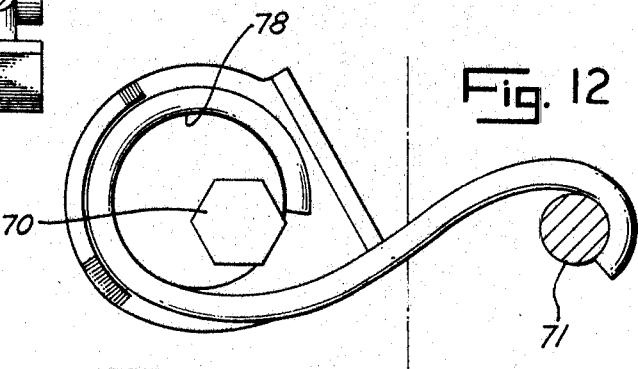
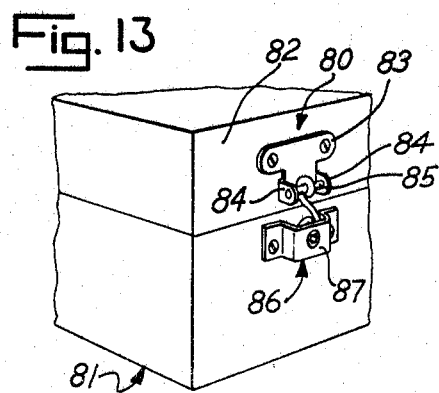
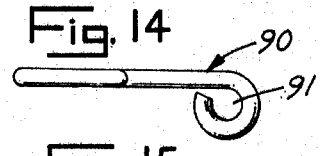
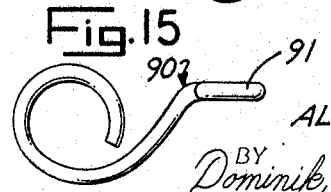
INVENTOR.
ALFRED C. LANGER
BY
Dominik, Stein & Knechtel
ATTORNEYS United States Patent Office
3,484,832
Patented Dec. 16, 1969

3,484,832
FASTENER MEANS
Alfred C. Langer, Pleasant Rise 2,
Brookfield, Conn. 06804
Filed Oct. 23, 1967, Ser. No. 677,201
Int. Cl. E05c 5/00, 19/12
U.S. Cl. 292—111                                11 Claims

ABSTRACT OF THE DISCLOSURE

A fastener having a shaft assembly for affixing it into a panel. The shaft assembly includes, generally, a shaft which is a tubular member with a hexagonal (or other shape) outer diameter and a hexagonal inner diameter or cavity therein. The shaft can vary in length for different applications. The ends of the shaft are turned down outside to receive a pair of ferrules, and to facilitate rotation therebetween. The ferrules are affixed preferably by staking or swaging them onto the shaft, in a fashion such that a friction between the ferrules and the shaft is provided. This friction restrains the fastener from rotating in an unwanted manner in its recess in the panel before it is desired that it be engaged with the anchor means in the adjacent panel.

---

This invention relate to fasteners, for removably securing panels, or other elements, together.

In U.S. Patent 3,309,115 there is disclosed a method and fasteners for removably securing panels, or other elements, together. The fasteners of the present invention are like the fasteners disclosed in said patent, however, they have been substantially modified and improved by providing a new shaft assembly for them. These shaft assemblies permit the fasteners to be more easily handled and installed in a panel, and furthermore, are extendable to accommodate various panel dimensions and applications.

More particularly, the shaft assemblies have ferrules which are now affixed to the shafts thereof in a fashion such as to unite the ferrules and the shaft so that they are held together for greater ease of installation into the panel and through the fastener latch assembly. Also, a predetermined rotational friction is created between the ferrules and the shaft, so as to keep the fastener from rotating (flopping) into an undesired position in its recess in the panel, until it is operated at the desired time for engagement with the anchor means in an adjacent panel.

It is therefore an object of this invention to provide improved fasteners for attaching panels, or other elements together.

It is a further object to provide improved fasteners for attaching panels together which may be easily installed in the factory, or in the field by persons without great skill, and without special tools.

Another more specific object is to provide an improved shaft assembly for the fasteners. In this respect, it is a further object to provide an improved shaft assembly for the fasteners which permits them to be more easily installed into the panel.

Other objects of the invention will in part be obvious and will in part appear hereinafter.

The above objectives are accomplished with a fastener having a shaft assembly for affixing them into a panel. The shaft assembly includes, generally, a shaft which is a tubular member with a hexagonal (or other shape) outer diameter and a hexagonal inner diameter or cavity therein. The shaft can vary in length for different applications. The ends of the shaft are turned down outside to receive a pair of ferrules, and to facilitate rotation therebetween.

The ferrules are affixed preferably by staking or swaging them onto the shaft, in a fashion such that a friction between the ferrules and the shaft is provided. This friction restrains the fastener from rotating in an unwanted manner in its recess in the panel before it is desired that it be engaged with the anchor means in the adjacent panel.

The new and improved assembly also provides a substantial number of other improvements for the fasteners. For example, (1) The length of its shaft can vary to accommodate various panel applications (thicknesses or whatever);

(2) It provides a simple method of "pinning" or of attaching the fastener into the panel;

(3) It serves as the receiver of the operating key, and as a torque transmission path to the fastener, since it is keyed to the eccentric included within the fastener, to operate the fastener to engage and disengage it with an anchor;

(4) It imparts a friction to prevent unwanted rotation of the fastener;

(5) The shaft thereof serves as an eccentric shaft upon which the fastener rotates;

(6) It serves as a carrier of, and a means of "seating" or setting both ferrules simultaneously in the panel upon installation;

(7) It permits two or more fasteners to be mounted on the same shaft in a panel; and (8) It permits the fastener, or fasteners to be mounted at any location in the panel, along the shaft.

The fastener also can be used as a hinge for a cover or lid on a box or the like. In this case, the hooked end thereof is bent 90° to the main portion of the fastener and is loosely but preferably fixedly secured to one-half of a hinge member. The main portion of the fastener comprises the other one-half of the hinge. When the fastener is operated, the cover or lid is drawn down and locked tightly to the box or the like.

Accordingly, another object is to provide an improved hinge for a cover or lid on a box or the like.

The invention accordingly comprises the apparatus embodying features of construction, combinations of elements and arrangement of parts, all as exemplified in the following detailed disclosure. For a fuller understanding of the nature and objects of the invention, reference should be had to the following detailed description taken in conjunction with the accompanying drawings, in which:

FIG. 1 is an exploded perspective view of a fastener exemplary of the invention;

FIG. 2 is an exploded perspective view of the shaft assembly for the fasteners, such as the fastener of FIG. 1;

FIGS. 3 and 3A are partial side plan views, partially sectionalized, illustrating the manner in which the ferrules are affixed to the shaft;

FIG. 4 is a side plan view of the fastener of FIG. 1, assembled;

FIG. 5 is a front plan view of the fastener of FIG. 4;

FIG. 6 is a perspective view generally illustrating the manner in which the fastener of FIG. 1 is installed in a panel;

FIG. 7 is a transverse sectional view taken through a pair of panels, illustrating the manner in which the fastener is installed within the panels and functions to secure the two panels together;

FIG. 8 is a sectional view taken along lines 8—8 of FIG. 7;

FIG. 9 is a side plan view of another fastener exemplary of the invention;

FIG. 10 is a view taken along lines 10—10 of FIG. 9, and further illustrating the manner in which a shaft assembly is affixed to the fastener;

FIG. 11 is a view taken along lines 11—11 of FIG. 9;

FIG. 12 is a side plan view of the fastener of FIG. 9 generally illustrating the manner in which it is operable to lock two panels together;

FIG. 13 is a perspective view illustrating a hinge-fastener exemplary of the invention; and FIGS. 14 and 15 are top and side plan views of the spring latch for the hinge-fastener of FIG. 13.

Similar reference characters refer to similar parts throughout the several views of the drawings.

Referring now to the drawings, in FIGS. 4 and 5 there is disclosed a fastener 10 which, as can be best seen in FIG. 1, includes an eccentric 11, and actuator 12 and an S-shaped spring latch 13. The fastener 10 is assembled, as described more fully below, and affixed within a cut out 18 in a panel 16 (FIG. 6) by means of a shaft assembly 20 extended through an aperture 21 in the panel 16 and through the shaft receiving aperture 22 in the fastener 10. An anchor rod 23 is secured within a cutout 24 in the panel 19, and the fastener 10 is activated, as described more fully below, to lockingly engage the spring latch 13 with the anchor rod 23, to lock the panels 16 and 19 together.

More specifically, the fastener 10 includes an eccentric 11, an actuator 12 and an S-shaped spring latch 13. The S-shaped spring latch 13, as can be best seen in FIG. 1, is formed from spring steel, and has a hook 26 on its one end which is adapted to lockingly engage with the anchor rod 23. Its opposite end is reversely folded so as to form a substantially closed circle 28 for receiving the eccentric 11. The eccentric 11 is formed by providing a hex-shaped aperture 29 in a circular-shaped disc member 30 in an axially off-set position. An outwardly projecting flange 31 preferably is formed about the aperture 29, on each of the opposite sides of the disc member 30, which flange functions to key the eccentric 11 to the actuator 12.

The acturator 12 is formed from a single blank of sheet spring steel which is cut to shape, as by stamping it, and folded so as to generally resemble a clam. An aperture 32 is provided in the actuator 12, through which the hooked-end 26 of the spring latch 13 extends. A hex-shaped aperture 33 corresponding in size to the flanges 31 on the eccentric 11 is formed in each of the opposite side walls 34 and 35 of the actuator, for receiving the flanges 31 to key the actuator 12 to the eccentric 11.

As can be best seen in FIGS. 5, 6 and 7, the edges of the side walls 34 and 35 are bent or folded inwardly, as at 36 and 37, to slidably engage the spring latch 13, so as to maintain control over the spring latch from its engagement with the anchor rod 23 to its locked position. The edges of the side walls 34 and 35 also are lightly beveled, as at 40 (see FIG. 4) to permit the actuator 12 to easily slide past the spring latch 13 when the latter is unlocked and disengages from the anchor rod 23 and returned to its retracted position. At 38 and 39 (FIG. 6), the edges of the side walls 34 and 35 are sharply beveled so as to engage and to force the spring latch 13 into engagement with the anchor rod.

In assembling the fastener 10, the eccentric 11 is fitted within the circle 28 of the S-shaped spring latch 13. Then, the spring latch and the eccentric are inserted in the actuator 12, with the hooked-end 26 of the spring latch extending out through the aperture 32 and with the flanges 31 extending through the apertures 33. The assembly is fixedly secured together by, for example, extending rivets 47 through apertures 49 formed in the acturator 12 and the eccentric 11, or by spot welding the acturator to the eccentric. The apertures 29 and 33 in the eccentric 11 and acturator 12, respectively, form the shaft receiving aperture 22 in the fastener 10.

The shaft assembly 20, as can be best seen in FIGS. 2, 3 and 3a, includes a hexagonal shaft 42 having turned ends 43 and 44 on each of the opposite sides of a hex-shaped key portion 45. The hex-shaped key portion 45 has substantially the same cross-sectional dimensions as the aperture 29 in the eccentric 11 so as to be slidable through it, to key the shaft 42 to the eccentric 11. The shaft 42 also has a hexagonal cavity 46 formed in it which is adapted to receive a correspondingly shaped key, to operate the fastener 10.

A pair of knurled ferrules 48 and 50 are affixed to the opposite ends 43 and 44 of the shaft 42, respectively, and are abutted against the edges of the hex-shaped key portion 45 to position them. The ferrules 48 and 50 preferably are frictionally affixed to the ends 43 and 44 of the shaft 42, so that the fastener 10 is kept from rotating, or flopping, into an undesired position in the cutout 18 in the panel 16, until it is operated by a hex key. This may be accomplished by, for example, swaging or staking the edge of the end of the shaft over the ferrules, as illustrated at 51 in FIG. 3. Alternately, the ferrules 48 and 50 may have a chamfered edge 52 formed internally thereof, and the edge of the ends of the shaft 42 spun or staked to overlap the chamfered edge 52, to affix them together as illustrated in FIG. 3a. Other methods also can be used.

The fastener 10 is affixed within the cut-out 18 in the panel 16, by means of the shaft assembly 20. This is easily and quickly accomplished by slotting the edge of the panel 16 using a straight-in shaper cut, or by routing, and by drilling the hole 21 completely through one face of the panel and partially through the opposite face using, for example, a shallow point drill. The panel 19 has a cut-out 17 formed in it in a similar fashion, and a hole is drilled through it for receiving the anchor rod 23. The panels 16 and 19 may be prepared beforehand at the factory, or in situ.

After the panels 16 and 19 have been prepared, the fastener 10 is inserted within the cut-out 18 in the panel 16 and is secured therein by extending the shaft assembly 20 through the hole 21 in the one face of the panel and through the shaft receiving aperture 22 in the fastener 10, until the ferrules 48 and 50 are seated in the holes formed in the faces of the panels, as illustrated in FIG. 7.

The panel edges are abutted together and the fastener 10 then is operated to lock the panels together by means of a hex key inserted within the interior hexagonal cavity 46 in the shaft 42. The shaft 42 being keyed to the eccentric 11 causes the latter to rotate, which action, in turn, causes the spring latch 13 to rotate. The actuator 12 also is keyed to the eccentric 11, and the beveled edges 38 and 39 on the actuator engage and assist in rotating the spring latch 13. As the hook 26 engages the anchor rod 23 and the eccentric 11 is continued to be rotated, the side walls 34 and 35 on the actuator 12 are caused to spread so as to slidably receive and clamp the spring latch 13 between them. The spring latch 13 is tensioned, causing the panels 16 and 19 to be tightly drawn together, as the eccentric 11 is continued to be operated. At an over-the-center point, further rotation of the eccentric 11 is stopped by the actuator 12, when its central folded portion or backbone 65 engages the spring latch 13, as illustrated in FIG. 8. In this position, the spring latch effectively locks and holds the panels together, under a compressive force, so that the joint between the panels is tight, and will stay tight.

To release and to retract the spring latch 13, the eccentric 11 is operated in a counter-clockwise direction. The beveled edges 40 on the side walls 34 and 35 of the actuator permits the actuator to easily slide past the spring latch 13. The spring latch 13, however, is clamped between the side walls 34 and 35 so as to maintain control over the spring latch.

It can be seen from the above description that the fastener 10 including the shaft assembly 20 provides a substantial improvement over the fasteners in the above-mentioned patent. In particular, as indicated above, the shaft assembly 20 provides a simple method of affixing or pinning the fastener 10 into a panel since it serves as a carrier of and a means of seating or setting both ferrules simultaneously in the panel. Accordingly, the shaft assembly 20 greatly reduces the number of components the panel fabricator has to handle, as well as the number of operations necessary to affix a fastener to the panel. The length of the shaft 42 of the shaft assembly 20 can be easily varied to accommodate various panel applications. The shaft 42 also serves as the receiver for the hex key for operating the fastener 10, and as the torque transmission path to the spring latch 13 to operate it to engage and disengage the spring latch with the anchor rod 23. The fricion between the ferrules 48 and 50 and the shaft 42 prevents unwanted rotation of the fastener so that the fastener is prevented from flopping to an undesired position within the panel. In panels having a substantial thickness, a large cut-out can be provided, and the fastener 10 can be located therein using spacers or the like, or two fasteners 10 can be affixed to the same shaft 42.

In FIGS. 9–12, there is illustrated a fastener 80 which is generally like the fastener 10, however, its eccentric and its actuator are formed as an integral eccentric-actuator unit 61 and its S-shaped spring latch 62 is a double spring including spring halves 62a and 62b which are joined together at the hook 63 thereof, as can be best seen in FIG. 11.

The eccentric-actuator unit 61 can be die-cast or sintered and includes a body or actuator portion 64 which has a pair of raised, circular-shaped areas 66 and 68 on each of its opposite sides. A hexagonal-shaped aperture 70 extends through the areas 66 and 68 and is axially offset so that the areas 66 and 68 each form an eccentric. A flat flange 72 is formed along one edge of the actuator portion 64 and extends perpendicularly to it, to each of its opposite sides. This flange 72 functions both to assist in maintaining the spring latch 13 in its locked position and to disengage the spring latch 62 from the anchor rod 71 (FIG. 12), in cooperation with the areas or eccentrics 66 and 68. A similar flange 73 is formed along another portion of the actuator portion 64, and the leading edge thereof is sharply beveled, as at 74, to force the spring latch 62 into engagement with the anchor rod 71. Its trailing edge is lightly beveled, as at 76 to permit the actuator portion to easily slide past the spring latch during the unlocking and disengagement cycle of operation.

The spring latch 62, as indicated above, is a double spring including spring halves 62a and 62b which are joined together at the hook 63. The opposite ends of each of the spring halves 62a and 62b are reversely folded so as to form substantially closed circles 78, in which are received the eccentrics 66 and 68.

In assembling the fastener 60, the ends of the spring halves 62a and 62b are merely spread apart so as to permit the eccentric-actuator unit 61 to be inserted between them, with the eccentrics 66 and 68 disposed within the closed circles 78. When released, the resiliency of the spring latch 62 clamps and retains the eccentric-actuator unit 61 therein.

A shaft assembly 20 is used to affix the fastener 60 within a panel, in the manner described above, and to operate it.

As the eccentric-actuator unit 61 is operated, by rotating it with a hex key, the spring latch 62 is caused to lockingly engage with the anchor rod 71, to forcibly hold the panels together under the compressive force exerted by the spring latch 62. The flange 72 abuts against the spring latch 62, when the fastener 60 is operated to its locked position, as illustrated in FIG. 12. Also, the beveled edges 74 and 76 assist in engaging and disengaging the spring latch 62 with the anchor rod 71, in the manner described above, as the eccentric-actuator unit 61 is operated.

In FIG. 13, there is illustrated a hinge 80 affixed to a box 81 and its top cover 82, which hinge is formed using a fastener generally like the fastener 10 of FIG. 1. The hinge 80 includes hinge portions 83 and 86. The hinge portion 83 can be, for example, a bracket which is adapted to be fixedly secured to the top cover 82 and which has a pair of wings or flanges 84 bent to extend outward and to support a hinge pin 85. The hinge portion 86 includes a fastener generally like the fastener 10 assembled and concealed within a mounting bracket 87, with the shaft 89 of the shaft assembly used to affix it therein exposed so that the fastener can be operated in the manner described above.

The spring latch 90 of the fastener, in this case, has its hooked-end formed so as to provide a substantially closed circle or loop 91, as can be best seen in FIGS. 14 and 15, and the latter is twisted so that it is disposed at an angle of 90° with respect to the remainder of the spring latch. This loop 91 has the hinge pin 85 extended through it, so that the box 81 and its top cover 82 are effectively affixed together in a fashion such that the top cover can be opened by pivoting it about the connection between the hinge pin and the loop 91 in the spring latch 90. Generally, on boxes or the like of any length, two or more of the hinges 80 would be affixed to it.

When the top cover 82 is closed (the opposite side of the top cover can be secured in any suitable fashion, as with a hasp lock or the like or even a fastener like the fastener 10 affixed to the box and adapted to lockingly engage an anchor rod or loop affixed to the top cover) and the fastener within the hinge portion 86 is operated, the top cover 82 is drawn down tightly against the rim of the box 81, in generally the same manner as two panels are drawn together. The compressive force exerted by the spring latch 90 functions to forcibly and resiliently retain the top cover closed.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Now that the invention has been described, what is claimed as new and desired to be secured by Letters Patent is:

1. Fastening means for securing together two objects comprising anchor means secured to one of said objects, eccentric means secured to the other one of said objects, a substantially S-shaped spring having a loop formed in one end thereof receiving said eccentric means therein, there being an aperture in said eccentric, a shaft assembly including a shaft which is slidable through said aperture in said eccentric means to secure said eccentric means and said S-shaped spring to said one object, said shaft and said aperture being formed so as to key said shaft to said eccentric means to operate it, said eccentric means upon being operated causing said spring to rotate through its arc of excursion to engage said anchor means, the eccentricity of said eccentric means in a first predetermined position tensioning said spring to resiliently and forcibly urge said object together, and in a second overcenter position of said eccentric means the tension of said spring in combination with the eccentricity of said eccentric means causing said eccentric means to be forcibly urged in the same direction of rotation to a position at which its rotation is arrested to effectively lock said spring in a positive forced engagement with said anchor means whereby said two objects are forcibly and resiliently urged together.

2. The fastening means of claim 1, further including an actuator having side walls and an end wall, said eccentric means being retained within said actuator and fixedly secured thereto, the ends of said side walls of said actuator being folded to resiliently and clampingly engage said S-shaped spring between them as said eccentric means is rotated to maintain control over the operation of said S-shaped spring from its engagement with said anchor means to its locked position.

3. The fastening means of claim 2, wherein the ends of said side walls of said actuator which first engage said S-shaped spring are sharply beveled so as to engage and to force said S-shaped spring into engagement with said anchor means, and the opposite ends thereof are lightly beveled to permit said ends of said side walls to easily slide past S-shaped spring when the latter is unlocked from said anchor means and returned to its retracted position.

4. The fastener means of claim 2 wherein said actuator is formed from a single blank of spring steel which is cut and folded generally clamp-shape.

5. The fastener means of claim 4 wherein said eccentric means has an upstanding flange formed about the periphery of said aperture on each of the opposite sides thereof, and wherein said actuator has apertures formed in it for receiving said flanges and for keying said actuator to said eccentric means.

6. The fastener means of claim 1 wherein said shaft assembly includes a shaft having a ferrule rotatably and frictionally affixed to each of its opposite ends which are adapted to be fixedly secured to said one object, the area of said shaft between said ferrules being formed to receive and to key said eccentric to said shaft, the frictional engagement between said ferrules and said shaft preventing said S-shaped spring from rotating to an undesired position, until it is operated by said eccentric means.

7. The fastener means of claim 6 wherein said ferrules are rotatably and frictionally affixed to said shaft by swaging the ends of said shaft in a fashion such that they bear against the edges of said ferrules.

8. The fastener means of claim 6 wherein said ferrules each have a chamfered internal edge and the ends of said shaft are swaged to overlap and bear against said chamfered edges to rotatably and frictionally retain them on said shaft.

9. The fastener of claim 1, wherein said S-shaped spring has a closed loop formed on the opposite end thereof which is bent 90° with respect to the remainder thereof, a bracket including a hinge pin extending through and secured within said closed loop, said eccentric means and the end of said S-shaped spring secured about it being enclosed and retained within a mounting bracket, wherein said fastener means can function as a hinge.

10. A hinge for affixing a top cover to a box comprising a bracket supporting a hinge pin which is adapted to be affixed to one of said box and said top cover, a generally closed mounting bracket adapted to be affixed to the other one of said box and said top cover, a fastener secured within said mounting bracket including eccentric means having an aperture therein, a shaft assembly including a shaft which is slidable through said aperture in said eccentric means to secure said eccentric within said mounting bracket, said shaft and said aperture being formed so as to key said shaft to said eccentric means to operate it, a substantially S-shaped spring having a loop formed in one end thereof receiving said eccentric means therein and having a generally closed loop formed in the other end thereof, said hinge pin being extended through and secured within said closed loop, the eccentricity of said eccentric means upon being operated causing said spring to tension to resiliently and forcibly urge said box and said top cover together, and in an overcenter position of said eccentric means the tension of said spring in combination with the eccentricity of said eccentric means causing said eccentric means to be forcibly urged in the same direction of rotation to a position at which its rotation is arrested to effectively lock said spring in a positive forced engagement with said hinge pin whereby said box and said top cover are forcibly and resiliently urged together.

11. The hinge of claim 10, wherein said closed looped end on said spring is disposed 90° with respect to the remainder thereof.

References Cited
UNITED STATES PATENTS

| | | | |
|---|---|---|---|
| 217,146 | 7/1879 | Quackenbush | 292—101 |
| 2,647,287 | 8/1953 | Jones | 292—111 XR |
| 3,309,115 | 3/1967 | Langer | 287—20.927 |

DONALD A. GRIFFIN, Primary Examiner

U.S. Cl. X.R.

287—20.927